April 24, 1951 T. J. SMULSKI 2,550,094
WIPER BLADE CONTROL LINKAGE
Filed July 26, 1945 2 Sheets-Sheet 1

INVENTOR
THEODORE J. SMULSKI
BY
Moses, Nolte, Crews & Berry
ATTORNEYS

Fig. 3.
Fig. 4.
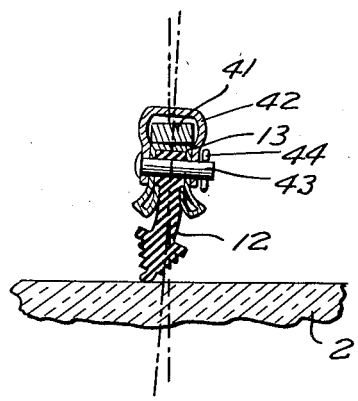
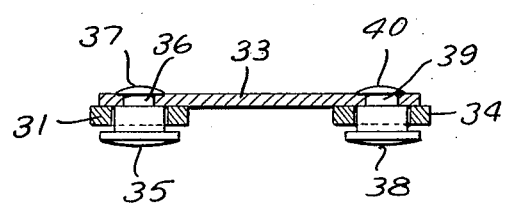
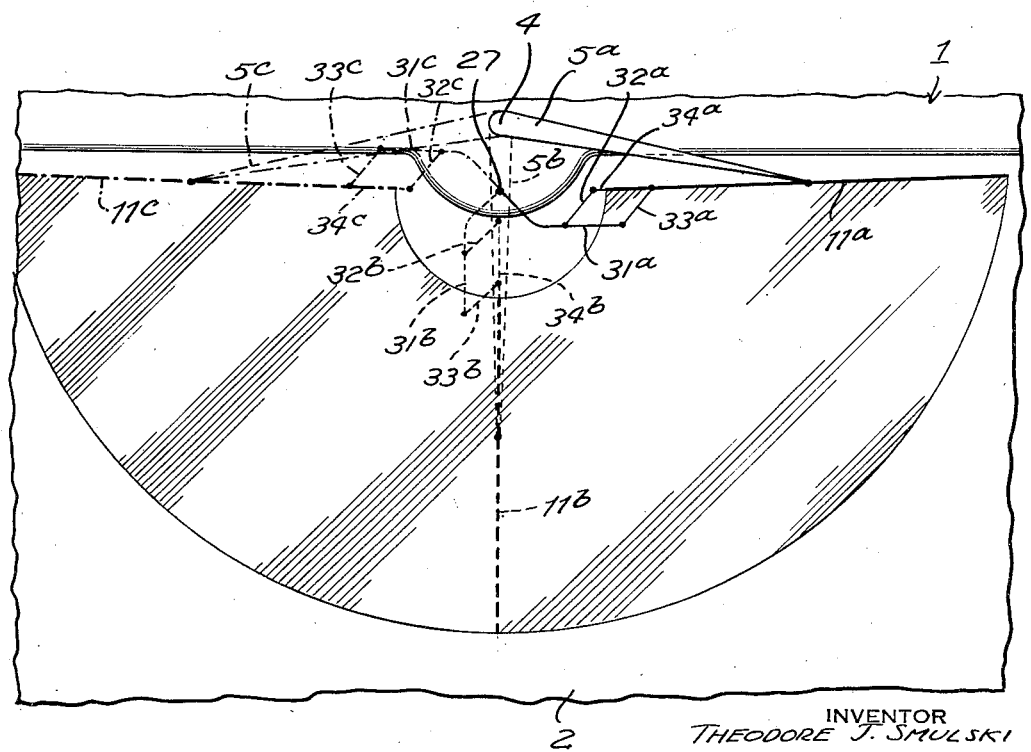
Fig. 5.

Patented Apr. 24, 1951

2,550,094

UNITED STATES PATENT OFFICE 2,550,094

WIPER BLADE CONTROL LINKAGE

Theodore J. Smulski, Gary, Ind., assignor to Productive Inventions, Inc., a corporation of Indiana Application July 26, 1945, Serial No. 607,117

17 Claims. (Cl. 15—255)

1

This invention relates to windshield wiper mechanism, and more particularly to mechanism of the kind in which the windshield wiper is caused to travel relative to, and through a wider angular range than, the wiper arm.

The windshield wiper motor is commonly mounted out of line with the windshield, and as a consequence of this the motor shaft is generally disposed outwardly a substantial distance from the adjacent edge of the windshield. The wiper arm is reciprocated or oscillated about the axis of the shaft within an operative range which permits the wiper to remain on the glass and clear of the windshield frame at the limits of its operative stroke. The stroke of the wiper arm is necessarily considerably less than two right angles, and if the wiper is secured in fixed angular relation to the wiper arm, the stroke of the wiper is correspondingly limited.

For the purpose of securing a wider angular range of movement of the wiper than is available to the wiper arm, it has been proposed to mount the wiper on the wiper arm with capacity for pivotal movement relative to the latter, and to provide movement modifying mechanism in association with the wiper for causing the wiper to move through a wider angular range than the wiper arm. In accordance with one such proposal a guide arm has been pivoted nearer to the windshield area than the wiper shaft axis, or even in the area of the windshield glass itself, and has been slidingly engaged with the wiper to maintain alignment therewith. In this way the wiper arm is made to serve as a driving crank of constant length for acting upon the wiper blade, the wiper blade having an effective arm which is of variable length but which is always shorter than the effective length of the wiper arm.

A movement modifying mechanism of the kind referred to is practical and not altogether unsatisfactory. It has the drawback, however, that the relative elongation and contraction of the combined arm formed by the wiper blade and its movement modifying arm involves relative linear movement with rubbing engagement of the wiper blade and movement modifying arm. Lubricant applied to the parts is quickly carried away, exposed to the weather and washed off, or combined with dust and rendered sticky. The result is that squeaking and frictional resistance to operation are apt to develop quickly. The movement modifying means referred to, moreover, introduces a difficulty with reference to the flopping over of the wiper blade at the beginning of each new stroke.

2

In accordance with the present invention, the wiper arm is mounted as before, and a movement modifying arm is pivotally mounted nearer to or within the windshield wiper area. This movement modifying arm, instead of being slidingly connected to the wiper blade, is connected through a pair of links and a clip, herein shown as combined with the modifying arm to form a parallel motion linkage.

With a construction of this kind the wiper blade is constrained to maintain a fixed angular relation to the modifying arm as in the prior construction. The pivotal connections of the links with the clip and with the modifying arm, however, do not involve so much frictional resistance nor tend to dissipate lubricant to the same extent as did the connections of the prior structure.

It is not essential that the linkage employed shall be a parallel motion linkage, so long as the linkage does not restrict movement of the wiper blade and the modifying arm within the operative range of the former.

Other objects and advantages will hereinafter appear.

In the drawing forming part of this specification Fig. 1 is a fragmentary view in front elevation showing fragments of a windshield and a vehicle body in association with a windshield wiper embodying the present improvements;

Fig. 3 is a sectional view taken on the line 3—3 of Fig. 1 looking in the direction of the arrows;

Fig. 4 is a sectional view taken upon the line 4—4 of Fig. 1 looking in the direction of the arrows and Fig. 5 is a diagrammatic view illustrating the action of the wiper blade under the influence of the wiper arm and the novel movement modifying mechanism.

Figures 1, 2:
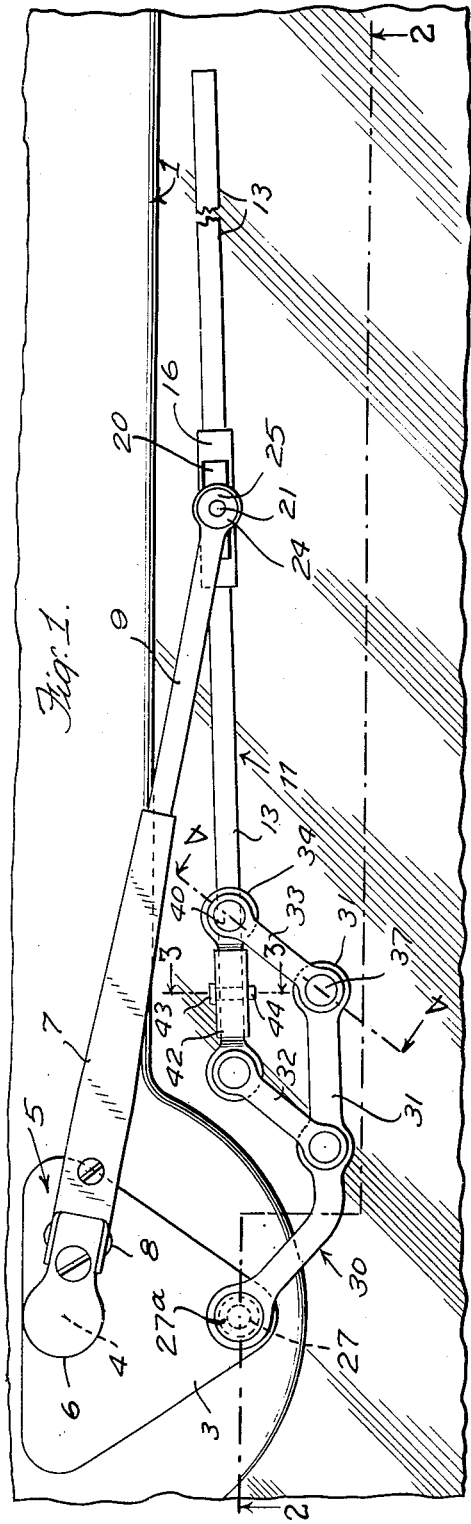
Fig. 2 is a fragmentary sectional view taken upon the line 2—2 of Fig. 1 looking in the direction of the arrows, some of the parts being broken away for revealing underlying structure.

In the embodiment of the invention illustratively disclosed herein, a windshield wiper motor is mounted behind and just above the windshield 2 of a motor vehicle. A mounting or mounting means preferably in the form of a triangular plate 3 is affixed to the outer or forward face of the vehicle body 1 and has its lower vertex extended downward to lie in the area of the windshield glass. A wiper shaft 4 extends forwardly through the header bar and through the upper central area of the plate 3, and has affixed to its forward end a wiper arm 5 which is generally of conventional construction, as disclosed, for example, in Fig. 2 of United States Letters Patent No. 2,326,402 granted to me on August 10, 1943. This wiper arm comprises an inner supporting section 6 which is fixedly attached to the shaft 4, a supported section 7 pivotally mounted through a pin 8 upon the section 6 and spring urged toward the windshield, and a longitudinally adjustable section 9 which is carried by the section 7 and which may be adjusted to vary the effective length of the wiper arm.

At the outer end of the section 9 the construction is modified as compared with that illustrated in Patent No. 2,326,402. The section 9 has a flat end portion through which a circular opening 10 is formed. The wiper blade assembly 11 is pivotally mounted upon the end portion of the section 9. The wiper blade assembly comprises a flexible wiper blade 12 which is carried in a rigid frame 13, the frame being desirably formed of sheet metal.

A cage clip 14 embraces the central portion of the frame 13 and is rigidly secured to the frame 13 by a cross pin or rivet 15. The cage clip 14 includes front body portions 16 which are spaced from the forward surface of the frame 13. A hanger 17 includes a base 18 whose end portions are trapped in the cage clip and urged into engagement with the body portions 16 by a bowed leaf spring 19. The base 18 is urged toward balanced engagement with the body portions 16 by the spring 19, but when the parts are in operation the spring is adapted to yield and to permit the clip 14 with the attached frame 13 to rock or flop over relative to the base 18 at the beginning of each wiper stroke, as is well understood in the art.

The hanger 17 includes a forwardly extending web 19a and a forward, transversely extending web 20. The web 20 carries a pivot pin 21 which is secured to the web by upsetting. A washer 22 is clamped between the web 20 and a shoulder of the pivot pin 21. A bearing ring 23 is located in the opening 10 of the wiper arm section 9 and surrounds the pivot pin. At the forward side of the arm section 9 a washer 24 is placed upon the pivot pin 21, and a cotter pin 25, inserted through the pivot pin 21 maintains the parts in assembled relation.

With the construction described the wiper blade assembly is carried by the wiper arm section 9 with capacity for free pivotal movement about the axis of the pivot pin 21, and the wiper blade is free to rock sidewise to a limited extent against the force of the spring 19. The pin 21 is disposed in a fore and aft position or substantially at right angles to the plane of the windshield.

Through the lower corner portion of the plate 3, a bearing 26 is disposed. A pivot pin 27 is passed through the bearing 26. A washer 28 is placed upon the pin 27, and the assembly is held together by a cotter pin 29 which is passed through the pivot pin 27. The pivot pin 27 has an enlarged end portion upon which a movement modifying arm 30 is fixedly mounted, the arm being secured to the pin 27 by upsetting of the forward end 27a of the latter.

The arm 30 is a bent arm, which has its outer end portion 31 extended in the direction in which it is desired that the wiper blade assembly 11 shall extend. Links 32 and 33 are pivotally connected to the arm portion 31, the detail being shown in the case of the link 33 in Fig. 4. Links 32 and 33 are identical, and their connections to the arm portion 31 and to a link 34 are identical.

A headed rivet 35 extends through an open-ing in the arm portion 31. A reduced shank portion 36 of the rivet extends through a circular opening of the link 33, and an end portion 37 of the rivet is upset to form a second head for clamping the link 33 against a shoulder of the rivet. At the opposite end of the link 33, a headed rivet 38 of the same construction is provided for the same purpose, this rivet also having a reduced shank portion 39, and an upset portion 40 which forms a second head for clamping the rivet to the link 33.

The rivets 35 and 38 are freely rotatable in the arm section 31 and in the link 34, respectively. As illustrated the arm portion 31 between the axes of the pivotal connections of the arm to the links 32 and 33 is equal in length to the link 34 between the axes of the pivotal connections of the link 34 to the links 32 and 33, while the links 32 and 33 are equal in effective length to another. These elements of necessity, therefore, form a parallelogram at all times, so that the link 34 is constantly parallel to arm portion 31. This means, of course, that the link 34 does not change its angular relationship to any portion of the movement modifying arm 30.

The link 34 has an intermediate portion 41 which is offset rearwardly. The U-shaped clip or channel 42 extends loosely around this intermediate portion 41 and embraces the frame 13 of the wiper blade at one end thereof. A headed pin 43 is passed through the opposed legs of the clip 42, and through the frame 13 and the blade 12, and is held in place by means of a cotter pin 44.

The reason for making the clip 42 extend loosely around the portion 41 of link 34 is in order to avoid interference with the flopping over of the wiper blade at the beginning of each stroke. The wiper blade is limited in this action by the coaction of the hanger 17 and the clip 14.

It will also be noticed that lost motion in a fore and aft direction is provided between the arm 30 and the link 34 (see Fig. 4) to avoid interference with the flopping over of the wiper blade.

In Fig. 5 the operation of the illustrated mechanism is diagrammatically shown. As the parts are viewed in Fig. 5, the extreme right hand positions are indicated by the same reference characters applied to the respective parts in the other figures, with the subscript $a$ added in each instance; the intermediate positions of the parts are indicated by the same reference characters with the subscript $b$ added in each instance; and the extreme left hand positions of the parts are indicated by the same reference characters with the subscript $c$ added in each instance. In the illustrative showing the wiper blade is caused to travel through a full 180°, notwithstanding the fact that the angular range of movement of the wiper arm 5 is less than 180° by a very substantial amount.

It will be observed that in the extreme right hand position the point of pivotal connection between the links 32 and 34 is relatively far from the axis of the bearing 27 so that the angle formed between the arm section 31 and the link 32 is an acute angle. In the intermediate or $b$ position the point of connection between 32 and 34 is quite close to the axis of the bearing 27, and the angle formed between 31 and 32 is an obtuse angle. When the parts reach their left hand extreme positions the point of connection between 32 and 34 is again relatively far away from the axis of the bearing 27 and the angle between 31 and 32 has again become acute.

It is, of course, evident that the link 34, and hence the wiper blade 11, remains parallel to arm portion 31 throughout the operation of the parts.

Other pairs of links 32 and 33 may be employed which are longer or shorter than the links illustrated and which are equal or unequal in length to one another. When links of unequal lengths are employed, movement of the wiper blade 13 in parallelism with arm portion 31 does not occur. Various relations might be utilized for producing desired relative movement of the wiper blade and the arm portion 31, care being taken, however, to avoid relationships which would interfere with movement of the wiper blade throughout a desired range.

I have described what I believe to be the best embodiments of my invention. I do not wish, however, to be confined to the embodiments shown, but what I desire to cover by Letters Patent is set forth in the appended claims.

I claim:

1. In a windshield wiper, the combination with an operating shaft, of a wiper arm carried thereby, a wiper blade connected to the arm with freedom for pivotal movement about a fore and aft axis, a movement modifying arm having a pivot connection arranged in a fixed relationship to the operating shaft, and a linkage connecting the movement modifying arm to the wiper blade at a point spaced longitudinally from the point of connection between the blade and wiper arm to control the angular movement of the blade in response to actuation by the wiper arm.

2. In a windshield wiper, the combination with an operating shaft, of a wiper arm carried thereby, a wiper blade mounted on the arm with freedom for pivotal movement about a fore and aft axis, a movement modifying arm having a pivot connection arranged in a fixed relationship to the operating shaft, and a parallel motion linkage connecting the movement modifying arm to the wiper blade to maintain the wiper blade in a predetermined relation to the movement modifying arm, said linkage including a pair of links pivotally connected to said wiper blade.

3. In a windshield wiper, the combination with an operating shaft, of a wiper arm carried thereby, a wiper blade mounted on the arm with freedom for pivotal movement about a fore and aft axis, a movement modifying arm having a pivot connection arranged in a fixed relationship to the operating shaft, and a linkage connecting the movement modifying arm to the wiper blade comprising a pair of links pivotally connected to the modifying arm, a third link pivotally connected to the respective links of said pair, and a clip loosely embracing the third link and secured to the wiper blade.

4. In a windshield wiper, the combination with an operating shaft, of a wiper arm carried thereby, a wiper blade mounted on the arm with freedom for pivotal movement about a fore and aft axis, a movement modifying arm having a pivot connection arranged in a fixed relationship to the operating shaft, and a parallel motion linkage connecting the movement modifying arm to the wiper blade comprising a pair of links of equal length pivotally connected to the modifying arm, a third link pivotally connected to the pair of links in parallel relation to the line joining the axes of the pivotal connections of the pair of links to the movement modifying arm, said third link having an offset portion intermediate its ends, and a clip loosely embracing the offset portion of the third link and secured to the inner end of the wiper blade.

5. In a windshield wiper, the combination with an operating shaft, of a wiper arm carried thereby, a wiper blade, means securing the wiper blade upon the wiper arm with freedom for pivotal movement about a fore and aft axis, and also with freedom for limited rocking movement about a longitudinal axis, a movement modifying arm having a pivot connection arranged in a fixed relationship to the operating shaft, and a linkage connecting the movement modifying arm to the wiper blade to control the angular movement of the latter about its fore and aft axis in response to actuation by the wiper arm, said linkage including movement transmitting members carried by the wiper blade and the modifying arm, respectively, and having freedom for relative movement about said longitudinal axis.

6. A movement modifying arm and linkage for windshield wipers comprising, in combination, a movement modifying arm, a pivotal bearing therefor, a pair of parallel links pivotally connected to the arm, a third link pivotally connected to the links of said pair in parallel relation to a line which passes through the axes of the connections of the pair of links to said arm, and a clip loosely embracing the third link and adapted for connection to a wiper blade.

7. Windshield wiper blade control means comprising, an arm having a wiper blade secured to one extremity and its opposite extremity constructed for pivotal connection to a mounting whereby the blade may be swung with respect to said pivot, a member, a first means pivotally connected to one extremity of said blade and said member, a second means having a portion pivotally connected to the member and a portion pivotally connected to the blade at a point intermediate the point of connection between the first means and the blade and the point of connection between the blade and arm, all constructed and arranged whereby when the member is pivotally connected to a mounting at a point spaced from the pivotal connection between the arm and the mounting blade will be held in a predetermined position with respect to the member when the blade is swung about the pivotal connections adjacent the mounting.

8. Windshield wiper construction comprising, a mounting, a shaft, a wiper blade, a first member having one end connected to the shaft and another end to the blade at a point intermediate its extremities, a second member pivotally carried by said mounting, a pair of spaced apart attaching means carried by an extremity of said blade apart from the point of connection between said first member and said blade, a link having a part pivotally connected to one of said attaching means and another part to said second member, and another link having a part pivotally connected to the other attaching means and another part to said second member, so constructed and arranged that the connection between the first member and blade, the connection between the second member and the mounting, and the connections between the links and the attaching means are substantially maintained in alignment when the wiper blade is swung with respect to a windshield.

9. A pair of arm members, each having a portion adapted for independent pivotal connection to mounting means, a wiper blade pivotally carried by another portion of one arm member, and linkage means, said linkage means having extremities pivotally connected to another portion of the other arm member and to the blade for moving the blade in a predetermined arc about its pivotal connection to said one arm member when the arm members are swung with respect to their respective pivotal connections to the mounting means.

10. A pair of arm members, each having a portion adapted for independent pivotal connection to mounting means, a wider blade pivotally carried by another portion of one arm member, and linkage means connecting another portion of the other arm member to one extremity of the blade for moving the blade in a predetermined arc about its pivotal connection to said one arm member when the arm members are swung with respect to their respective pivotal connections to the mounting means.

11. A backing for cleaning means, holding means carried by said backing, elongated attaching means held in place by said holding means, a supporting arm, and a pair of links pivotally connected to the extremities of said attaching means and to said supporting arm for maintaining said backing and said supporting arm generally parallel when the backing is moved through an arc.

12. Windshield wiper blade control means comprising, a pair of arm members, a portion of each arm member being adapted for independent pivotal connection to a mounting, a wiper blade linkage pivotally connected to another portion of one of said arm members, and linkage means pivotally connected to said blade unit adjacent one of its extremities and to another portion of said other arm member in a manner whereby said blade is at all times held at a predetermined position with respect to said other arm member when the blade is swung by the arm members relative to the pivotal connections to which the members are adapted to be connected.

13. In a windshield wiper, the combination with an operating shaft, of a wiper arm carried thereby, a wiper blade mounted on the arm with freedom for pivotal movement about a fore and aft axis, a movement modifying arm having a pivot connection arranged in a fixed relationship to the operating shaft, and a linkage connecting the movement modifying arm to the wiper blade comprising a pair of links pivotally connected to the modifying arm and to said blade, the connection between said links and said blade being constructed and arranged to permit tilting of the blade as it is moved across the windshield.

14. A windshield wiper comprising a mounting plate, an operating shaft extending through the plate, a wiper arm carried by the shaft, a wiper blade mounted on the arm with freedom for pivotal movement about a fore and aft axis, a secondary shaft carried by the plate, a movement modifying arm pivotally connected to the secondary shaft, and a parallel motion linkage connecting the movement modifying arm to the wiper blade to maintain the wiper blade in a predetermined relation to the movement modifying arm, said linkage including a pair of links pivotally connected to said wiper blade.

15. A movement modifying arm and linkage for windshield wipers comprising, in combination, a mounting plate, a pivot carried by said mounting plate, a movement modifying arm having its inner end connected to said pivot, a pair of parallel links pivotally connected to the outer extremity of the arm, a third link pivotally connected to said pair of links in parallel relation to a line which passes through the axes of the connections of the pair of links to said arm, and a clip loosely embracing the third link and adapted for connection to a wiper blade.

16. A windshield wiper blade assembly comprising an elongated backing, a resilient wiper element secured to said backing, a channel secured to said backing in a manner whereby the base wall of the channel is arranged in spaced apart relationship to the backing, and elongated attaching means having a portion arranged in said space and also having enlarged ends located beyond the ends of the channel, said enlarged ends being of a sufficient size to prevent escape of the attaching means from the channel, and a link pivotally connected to each of the enlarged ends of the attaching means.

17. A windshield wiper blade assembly comprising an elongated backing, a resilient wiper element secured to said backing, a channel secured to said backing in a manner whereby the base wall of the channel is arranged in spaced apart relationship to the backing, and elongated attaching means having a portion arranged in said space and also having enlarged ends located beyond the ends of the channel, said enlarged ends being of a sufficient size to prevent escape of the attaching means from the channel and each of said enlarged ends being provided with an aperture.

THEODORE J. SMULSKI.

REFERENCES CITED

The following references are of record in the file of this patent:

UNITED STATES PATENTS

| Number | Name | Date |
|---|---|---|
| 1,018,147 | Woodhull | Feb. 20, 1912 |
| 1,137,546 | Sonderegger | Apr. 27, 1915 |
| 1,153,848 | Loring | Sept. 14, 1915 |
| 2,030,286 | Evans | Feb. 11, 1936 |
| 2,158,254 | Rosenberg | May 16, 1939 |

FOREIGN PATENTS

| Number | Country | Date |
|---|---|---|
| 645,789 | Germany | June 3, 1937 |